(12) United States Patent
Shimakawa

(10) Patent No.: US 6,743,402 B2
(45) Date of Patent: Jun. 1, 2004

(54) PURIFIER OF NOXIOUS GAS AND METHOD FOR MANUFACTURING THE SAME

(76) Inventor: Kenzo Shimakawa, 2-10, Miyamadai 3-chome, Kawanishi-shi, Hyogo 666-0151 (JP)

(*) Notice: Subject to any disclaimer, the term of this patent is extended or adjusted under 35 U.S.C. 154(b) by 27 days.

(21) Appl. No.: 10/042,814

(22) Filed: Jan. 8, 2002

(65) Prior Publication Data

US 2002/0064486 A1 May 30, 2002

Related U.S. Application Data

(63) Continuation of application No. 09/701,051, filed as application No. PCT/JP99/02753 on May 25, 1999, now abandoned.

(30) Foreign Application Priority Data

May 26, 1998 (JP) ............................................ 10-144361

(51) Int. Cl.[7] .................... B01D 53/72; B01D 53/78; B01D 53/86
(52) U.S. Cl. .................. 422/171; 422/170; 422/172; 422/177
(58) Field of Search ................ 422/168–172, 422/177

(56) References Cited

U.S. PATENT DOCUMENTS

| | | |
|---|---|---|
| 4,112,054 A | 9/1978 | Feingold et al. |
| 4,378,334 A | 3/1983 | Alguire et al. |
| 4,517,167 A | 5/1985 | Popescu et al. |
| 4,828,810 A | 5/1989 | Kruse et al. |
| 5,034,210 A | 7/1991 | Winslow, Jr. et al. |
| 5,082,475 A | 1/1992 | Bentz |
| 5,184,462 A | 2/1993 | Schatz |

FOREIGN PATENT DOCUMENTS

| | | |
|---|---|---|
| EP | 0 798 282 | 10/1997 |
| JP | 57-165223 | 4/1981 |
| JP | 57-4214 | 1/1982 |
| JP | 57-184414 | 11/1982 |
| JP | 5-293326 | 11/1993 |
| JP | 6-304595 | 11/1994 |
| JP | 8-215540 | 8/1996 |
| JP | 9-290135 | 11/1997 |
| JP | 9-314116 | 12/1997 |
| JP | 11-90177 | 4/1999 |
| JP | 11-179151 | 7/1999 |

*Primary Examiner*—Hien Tran
(74) *Attorney, Agent, or Firm*—Merchant & Gould PC

(57) ABSTRACT

A purifier of a noxious gas is provided with structure for supplying a gas containing a noxious gas component, a buffer using a liquid which dissolves the noxious gas component in the supplied gas temporarily and later releases the dissolved noxious gas component, and structure for purifying the noxious gas component in the gas supplied from the buffer means. The liquid in the buffer dissolves the noxious gas component when the concentration of the noxious gas component in the supplied gas is high and releases the noxious gas component dissolved thus far when the concentration is low. When the noxious gas is ethylene oxide, water is used as the liquid.

20 Claims, 9 Drawing Sheets

PURIFIER OF NOXIOUS GAS AND METHOD FOR MANUFACTURING THE SAME

This application is a continuation of application Ser. No. 09/701,051, filed Nov. 22, 2000, now abandoned, which is a 35 USC 371 application based on PCT/JP99/02753 filed May 25, 1999, which application(s) are incorporated herein by reference.

TECHNICAL FIELD

The present invention relates to a purifier of a noxious gas containing all kinds of hazardous components or malodorous components.

BACKGROUND ART

There are noxious gases containing hazardous components or malodorous components such as ethylene oxide gas used for sterilization procedure in hospitals or the like, carbon monoxide or hydrocarbon etc. exhausted from e.g. combustion equipment or from drying equipment for organic solvents. These hazardous components and these malodorous components should be purged from noxious gases before the noxious gases are released to the atmosphere. One approach to purify a noxious gas is to pass the noxious gas through an oxidation catalyst. The use of an oxidation catalyst can accelerate the oxidation reaction of ethylene oxide gas, carbon monoxide, hydrocarbon or the like at a lower temperature (for example, 200 to 400° C.) than that for burning directly, so that the noxious gas can be changed into innocuous carbon dioxide or water vapor.

Such a gas purifier has, depending on e.g. the amount of catalyst stored inside, limitations with respect to the quantity of noxious gas components to be purified per unit of time (hereinafter referred to as "processing capability"). If a noxious gas in excess of the upper limit of this processing capability (concentration or gas volume) is supplied to the purifier, the noxious gas is exhausted without being sufficiently purified. In using this type of gas purifier, it is therefore important to prevent the supply quantity of noxious gas components, even temporarily, from exceeding the processing capability of the purifier.

However, a noxious gas is not always produced in a constant quantity and in a constant concentration. It is rather common that the quantity and the concentration of gas produced fluctuate to a large extent. Moreover, depending on the release source, a noxious gas is often produced intermittently. In such a case where the quantity and the concentration of noxious gas fluctuate, the installation of a purifier with processing capability covering the peak quantity of noxious gas is not an economical solution from the viewpoint of cost of the device and space to be occupied by the device.

Thus, consideration has been given to equipping a purifier with a cushioning device (buffer), which supplies the noxious gas to the purifier after the changes of quantity and concentration of a noxious gas have been smoothed, namely reduced, as much as possible. The simplest example of such a buffer is the use of a variable-volume container such as a plastic bag. In this case, the produced noxious gas is gathered temporarily in a plastic bag and then fed in an almost constant quantity into a purifier by the operation of a suction fan or the like of the purifier.

However, even if the use of a variable-volume container as a buffer can reduce fluctuations in the quantity of the supplied noxious gas, fluctuations of noxious gas concentration cannot be controlled. In other words, it is not possible to prevent the concentration of noxious components (components to be purified) contained in a noxious gas from fluctuating. Furthermore, although a plastic bag is inexpensive, this plastic bag needs to have a considerably large size for demonstrating sufficient buffer effects. As a result, a large space is required for installation, and the installation method is also not easy. Additionally, for safety reason, the plastic bag may have to be placed inside a casing having a certain degree of mechanical strength, which forms a dual structure resulting in higher cost. There are also inflammable gases and explosive gases included in noxious gases, so that this aspect should be taken into account as well.

Accordingly, it is an object of the present invention to provide a purifier of a noxious gas equipped with a buffer means for purifying the noxious gas economically and safely when the quantity or the concentration of the noxious gas fluctuates.

DISCLOSURE OF INVENTION

In order to accomplish the above object, a purifier of a noxious gas of the present invention is provided with means for supplying a gas containing a noxious gas component, buffer means using a liquid which dissolves the noxious gas component in the supplied gas temporarily and later releases the dissolved noxious gas component, and means for purifying the noxious gas component in the gas supplied from the buffer means.

According to the purifier using such a liquid, the noxious gas component can be supplied to the purification means after having been reduced at least to a certain value. Furthermore, there is no need to install a special apparatus or facility for carrying out this process. The size of the device itself can be determined appropriately according to the required processing capability and will not be unnecessarily large. Furthermore, if a noncombustible and inactive liquid is chosen as the liquid to be used for the buffer means, even inflammable and explosive noxious gases can be treated safely.

Apart from the present patent application, the applicant of the present invention has filed another patent application of a purifier equipped with buffer means using a gas adsorbent such as activated carbon (Japanese Patent Application (Tokugan Hei) 9-250245). According to this device, the noxious gas can be supplied to the purification means after the concentration is controlled at least to a certain value. And the same with the purifier of the present invention, the device in the aforementioned other application also demonstrates excellent cost performance. However, a certain kind of noxious gas such as ethylene oxide generates heat (ca. 70 to 80° C.) when adsorbed to activated carbon etc., so that the noxious gas may not be purified successfully. On the other hand, the purifier of the present invention has the advantage of solving this problem of heat generation by using a liquid for the buffer means.

In the present invention, a noxious gas implies not only a gas which is hazardous for organisms including human beings or harmful to the environment, but also to all kinds of gases that preferably are removed, such as a hazardous gas of inflammable or explosive nature, an unpleasant gas with offensive odor, and a gas containing this kind of hazardous and unpleasant gas. The gas may be inorganic or organic. As examples of noxious gases, there are a volatile organic compound gas such as above-mentioned ethylene oxide, toluene, and acetone etc., and an inorganic compound gas etc. such as ammonia or the like. Gases containing a noxious gas can be listed, for example, emission gas of a sterilization apparatus used for sterilizing medical instruments (ethylene oxide-containing gas), emission gas of an incinerator, emission gas of a plant, exhaust gas of an organic solvent dryer, exhaust gas of an incinerator, exhaust gas of a draft chamber, and exhaust gas of a paint booth.

In the purifier of the present invention, it is preferable that the liquid in the buffer means dissolves the noxious gas component when the concentration of the noxious gas component in the supplied gas is high and releases the noxious gas component dissolved thus far when the concentration is low. Accordingly, the noxious gas component can be supplied to the purification means in a constant concentration, and the purification can be carried out efficiently. Such a function originally should be given to the liquid itself. However, if this function is not carried out sufficiently, as will be described later, a gas containing a noxious gas or a clean gas may be blown into the liquid to force dissolution or release.

It is preferable that the purifier of the present invention includes means for supplying a clean gas, with which the clean gas is supplied into the liquid in the buffer means. By supplying the clean gas into the liquid in the buffer means, the noxious gas dissolved in the liquid can be released even more. As a result, this liquid is purified and can be used once again for dissolving a noxious gas with high concentration.

There are two ways of supplying a clean gas into the liquid in the buffer means. The first embodiment is to supply a gas containing a noxious gas and a clean air by turns, and the second embodiment is to supply a gas containing a noxious gas and a clean gas at the same time. Depending on the configuration of the device and so forth, it is possible to choose one or the other embodiment appropriately, but the second embodiment is preferable. This is because when a gas containing a noxious gas and a clean gas are supplied simultaneously into the liquid in the buffer means, the dissolution and the release of the noxious gas occur simultaneously. Thus, the liquid can demonstrate the buffer effect and control the concentration of the noxious gas to be supplied into the purification means at least to a certain value. Moreover, the processing time can be reduced considerably from that required for the above first embodiment.

In the purifier of the present invention, it is preferable that the buffer means includes means for bringing a gas released from a liquid once again into contact with the liquid. This configuration enhances the buffer effect, since the noxious gas contained in the released gas dissolves once again in the liquid.

In the purifier of the present invention provided with the means for conducting the repetitive contact mentioned above, in the case where the process of contacting once again and the process of supplying a clean gas into the liquid both are carried out in the same container, the clean gas should not be supplied into the liquid when the gas released from the liquid is brought once again into contact with the liquid. On the other hand, it is preferable to supply the clean gas into the liquid at the time when the gas released from the liquid is not brought once again into contact with the liquid.

In the purifier of the present invention provided with the means for conducting the repetitive contact mentioned above, it is preferable that the buffer means includes a dissolution section for dissolving a noxious gas into the liquid, a purification section for cleaning the liquid containing the dissolved noxious gas with a clean gas, and means for bringing the gas released from the liquid in the dissolution section into contact with the liquid cleaned in the purification section Accordingly, the gas containing the noxious gas can be supplied simultaneously with the clean gas, so that the processing time and the processing efficiency are improved significantly. In the buffer means of this purifier, it is preferable that the liquid circulates between the dissolution section and the purification section, and that the gas containing the noxious gas is fed into the purification means from at least the purification section of the two aforementioned sections. Consequently, the processing time and the processing efficiency are improved even more.

When the gas released from the liquid and the liquid are brought into contact once again, the purifier of the present invention preferably is equipped with means for increasing at least either the contact area or the contact time. This is because the re-dissolution process of the noxious gas with the liquid can be carried out even more efficiently.

For increasing the above contact area or the above contact time, it is preferable to use, for example, means to shoot the liquid in the form of fog or shower, or means to let the liquid run along the surface of a member. This member should have a large surface area, for example, a horseshoe-shaped (U-shaped) member made of ceramics, metals, or resin etc. By placing a large number of such members and by pouring the liquid over these members, the liquid runs along the surfaces of these members, thereby contacting and dissolving the noxious gas. This kind of member is generally available on the market as a member used for increasing a gas-liquid contact area. Besides the aforementioned horseshoe shape, there are other forms such as Raschig ring, partition ring, primtriangle or the like. Not only these members but also a member with a large surface area such as a porous member, a member made of fiber, or the like can be used. Preferably, the members used here should have a small pressure loss, that is, good permeability.

It is preferable in the purifier of the present invention that the purification section mentioned above cleans the noxious gas component by means of a catalyst. In comparing with the method for purifying a noxious gas by burning, the use of catalyst has not only the advantage of reduction in energy costs but also of superiority in safety. As for the catalyst mentioned above, for example, oxidation catalysts can be used. To name some concrete examples, precious metal catalysts such as platinum and palladium, magnesium oxide, and copper oxide can be used. Furthermore, these catalysts usually are supported by a carrier, for example, by calcium aluminates. A carrier generally is formed e.g. in a honeycomb construction with permeability, and a catalyst is supported by the carrier through impregnation and adhesion. The present invention prefers to use a platinum catalyst supported by calcium aluminates of honeycomb construction. Moreover, the amount of catalyst used etc. is not particularly limited and can be decided appropriately depending on the intended processing capability and other conditions.

It is preferable that the purification section mentioned above includes means for detecting a catalytic temperature and means for controlling the quantity of a noxious gas to be supplied into the purification means based on the temperature detected by the detection means of catalytic temperature. If the concentration of a noxious gas increases, the catalytic temperature may rise due to the accelerated catalytic reaction, and the aforementioned means are provided to prevent this from occurring.

In the present invention, the liquid used for the above buffer means preferably has low volatility, less harmfulness, and small heat release when burned. Examples of the above liquid are: aqueous solvents such as water and sodium hydroxide aqueous solution; organic solvents such as alcohols, e.g. methyl alcohol, ethyl alcohol, and polyalcohol derivatives etc., e.g. ethylene glycol. The above liquid may be used individually or in combinations of two or more different kinds. When two or more different kinds of liquid are used, they may be used in a mixed form or separately. These liquids are selected appropriately according to the kind of noxious gas and so forth. For instance, water is preferably used for ethylene oxide, methyl ethyl ketone, isopropyl alcohol or the like. While alcohols are used preferably for xylene, toluene, methyl isobutyl ketone or the like, ethylene glycol is used preferably for acetone.

In the present invention, if a noxious gas to be purified is ethylene oxide, water should be used as the above liquid for the reason described above. Additionally, if a noxious gas to be purified is ethylene oxide, the concentration of ethylene oxide contained in a gas supplied from buffer means to purification means is preferably controlled to be 20000 ppm or less. The lowest critical concentration of explosion is 3% for ethylene oxide, so that the concentration of 20000 ppm or less does not cause a safety problem. For other noxious gases, the lowest concentration of supply to the purification section is determined appropriately by the nature of the gas etc. For example, the concentration for methyl ethyl ketone is 1.8%, 2.0% for isopropyl alcohol, 1.0% for xylene, 1.2% for toluene, 1.4% for methyl isobutyl ketone, and 2.15% for acetone.

In the present invention, the above clean gas should be an inert gas, and for the reasons such as application and cost, it is preferable to use clean air. In the present invention, a clean gas implies a gas that substantially does not contain a noxious gas to be purified, and the use of a filter etc. for collecting dust is not particularly necessary. However, it is preferable to use a gas that has passed through a dust collecting filter for durability of the device or with respect to catalytic activity and so forth.

In the present invention, the means for supplying a gas into the liquid is preferably operated by blowing the gas into the liquid and producing a large quantity of bubbles. It is because this method improves the solubility of the gas into the liquid. One example of this means for producing bubbles is blowing the gas into the liquid through a porous member.

In the present invention, when a water-sealed vacuum pump is used for supplying a gas containing a noxious gas together with water, it is preferable that the water circulates between the water-sealed vacuum pump and the buffer means. This system can utilize the water of the water-sealed vacuum pump effectively.

This purifier preferably is configured such that, when an abnormal state breaks out, the water and the gas containing a noxious gas supplied from the water-sealed vacuum pump are not supplied into the buffer means but instead released to the outside of the purifier. Furthermore, it is preferable to store the released water and the released gas containing a noxious gas temporarily in a storage tank. After the purifier has returned to a normal state, the water and the gas to be purified are supplied from the storage tank into the buffer means and then cleaned by the purification means.

Next, the present invention provides a method for purifying a noxious gas by which a gas containing a noxious gas component is purified. The method includes the steps of: passing the gas through buffer means using a liquid that dissolves the noxious gas component temporarily and releases the dissolved component later, and supplying the above gas into purification means. Here, the gas supply is intermittent, or the concentration of the noxious gas component becomes intermittently higher. With this method, the gas is supplied to the purification means after the peak concentration value of the noxious gas component in the gas is reduced. This method can be carried out with the use of the purifier of the present invention described above. Due to the reasons mentioned above, it is preferable in this method to supply the gas containing the noxious gas and the clean gas simultaneously into the liquid in the buffer means.

BEST MODE FOR CARRYING OUT THE INVENTION

Hereinafter, embodiments of the purifier of the present invention will be described with reference to the accompanying drawings.

Embodiment 1

Figure 1:
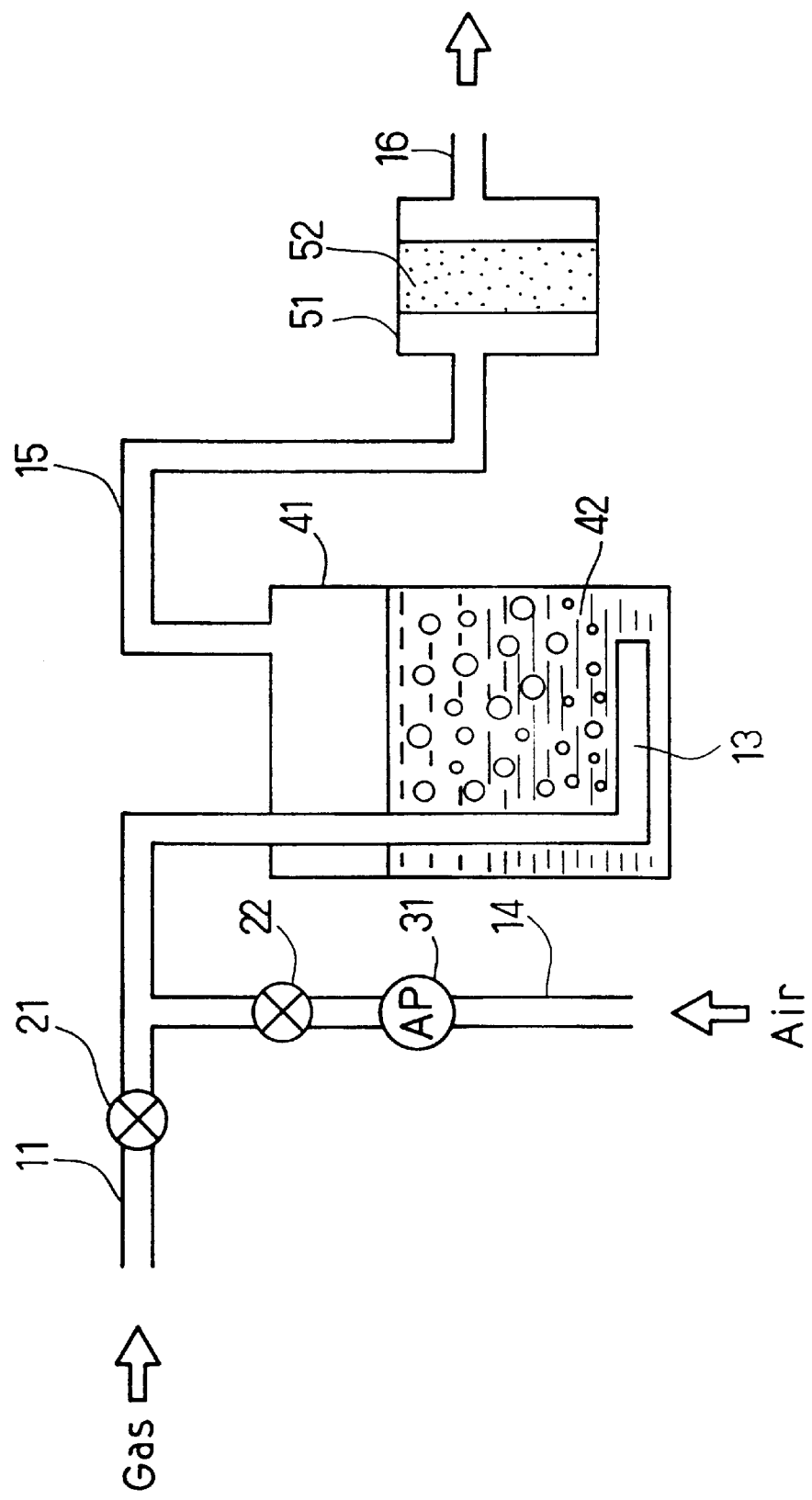
FIG. 1 is a diagram illustrating a schematic configuration of a purifier of Embodiment 1 of the present invention.

A device illustrated schematically in FIG. 1 has a buffer section including a container 41 and a liquid 42 filled in the container 41, and a purification section 51 including a catalytic section 52. This device is provided with a supply pipe 11 for a gas containing a noxious gas and a switching valve 21 disposed along the pipe 11. An end portion 13 of the pipe 11 is located at the bottom of the container 41 (submerged in the liquid 42). Furthermore, the pipe 11 is connected to a supply pipe 14 for clean air along its body (further than the position of the switching valve 21 on the side of the end portion 13). A switching valve 22 and an air pump 31 are disposed along the supply pipe 14. One end of a pipe 15 is connected to the top part of the container 41, and the other end of the pipe 15 is connected to the purification section 51. Moreover, one end of an exhaust pipe 16 of cleaned gas is connected to the purification section 51, and the other end is open to the outside.

The gas preferably is released into the liquid through numerous pores disposed on the end portion 13 of the pipe 11 or through pores of porous materials joined to the end portion 13.

The quantity of the liquid 42 is one decisive factor of buffer capacity and is determined appropriately by the processing capability of the purification section, the concentration of the noxious gas to be treated and so forth. For example, in the case where the noxious gas to be purified is ethylene oxide, the liquid is water, and the volume of the processing chamber in the sterilization apparatus that produces the noxious gas is 40 liters, the quantity of the liquid (water) should be generally 5 to 10 liters. When the volume of the processing chamber is 100 liters, for example, the volume of the container 41 should be about 15 liters. When the volume of the processing chamber is 200 liters, for example, the volume of the container 41 should be about 28 liters. There is no particular limitation with respect to the shape of the container 41, so that the shape of the container 41 can be spherical, cylindrical, rectangular, cubical etc. If the container 41 has a rectangular shape, the internal size is, for example, 230×250×660 mm. The level of the liquid 42 is preferably determined to be as high as possible for absorbing the gas efficiently. The surface of the liquid 42 should not be too small because the gas evolution depends thereon. The preferable ratio (h/a) of the liquid level (h) to the liquid surface (a) should be at least 2. The temperature of the liquid, which has an effect on dissolution and release of the noxious gas, is generally in the range between 5 and 20° C., and preferably in the range between 10 and 20° C. The liquid temperature may be regulated by using a general temperature regulator. However, such a regulator is usually unnecessary because the liquid is abundantly present in relation to the quantity of gas to be dissolved, unless the outside air temperature is extremely low or high. This is also one of the advantages of the purifier of the present invention. Moreover, when a gas is fed into the purification section, the concentration of the noxious gas contained in this gas is determined appropriately by the lowest critical concentration of explosion or combustion, or by the processing capability of the catalyst and so forth. For the treatment of ethylene oxide, as described above, the upper limit of the concentration should be 20000 ppm or less.

A noxious gas can be cleaned by using this purifier, for example, by means of the following two methods.

In the first method, while the switching valve 22 of the supply pipe 14 of clean air is kept closed, the switching valve 21 is opened. A gas containing a noxious gas passes through the pipe 11 to the end portion 13 of the pipe 11 from which the gas is blown into the liquid 42. At this time, the flow rate of the gas can be regulated appropriately by adjusting the pore size of the pipe 11 or the opening of the valve 21 etc. Then, the blown gas turns into countless bubbles, and while the bubbles go up to the liquid surface, the noxious gas contained in the gas dissolves entirely or partly into the liquid. The gas released from the liquid surface therefore has a lower concentration of noxious gas than in the beginning. The gas released from the liquid surface passes through the pipe 15 which is connected from the top part of the container 41 to the purification section 51 where the gas is cleaned by the catalytic section 52. This catalytic section 52 can be formed by using one of the conventional methods which, for example, is disclosed by the applicant of the present invention in Japanese Laid-open Patent Application (Tokkai Hei) 9-290135, or by using other methods that may be selected appropriately according to the type of the noxious gas etc. The cleaned gas is released from the pipe 16 to the outside.

In the above process, the switching valve 22 is opened when the noxious gas concentration in the gas containing a noxious gas is reduced, and clean air is blown into the liquid 42 with the air pump 31. Consequently, the noxious gas dissolved in the liquid 42 is released from the liquid 42 and then fed into the purification section 51 where the gas is cleaned in the same manner mentioned above. During this process, the gas containing a noxious gas may be or may not be supplied. When the concentration of the noxious gas dissolved in the liquid 42 becomes high, the noxious gas dissolves less into the liquid, thereby deteriorating the buffer capacity. In this case, by closing the switching valve 21, the supply of the gas containing a noxious gas is stopped temporarily. Then, clean air is blown into the liquid 42 in the same manner mentioned above for releasing the dissolved noxious gas from the liquid 42. The gas is fed into the purification section 51 and cleaned.

According to the first method described above, when the gas is fed into the purification section 51, the noxious gas concentration can be regulated at a constant level so that the purification of the noxious gas can be carried out efficiently.

Moreover, in switching the valve or operating the pump as described above, it is preferable to use a gas concentration sensor or the like for detecting the noxious gas concentration of the liquid 42 and the concentration of noxious gas supplied into the purification section 51 and to control these and other operations automatically based on the detection results.

Next, the second method will be explained. In this method, the switching valve 21 and the switching valve 22 are both opened, and clean air as well as a gas containing a noxious gas are blown into the liquid 42. Consequently, the gas containing a noxious gas and the clean air both will turn into countless bubbles, which then go up to the liquid surface.

In this process, the noxious gas is dissolved and released at the same time. The gas released from the liquid 42 passes through the pipe 15 and is fed into the purification section 51 to be cleaned in the catalytic section 52. The cleaned gas is released through the pipe 16 to the outside.

In the second method described above, the buffer effect of the liquid 42 contributes to maintaining the concentration of noxious gas contained in the gas to be fed into the purification section 51 at a constant level. Therefore, with the use of this second method, the gas containing a noxious gas can be fed into the purification section in one step without going through multiple steps as in the first method described above. In this way, the processing time for purification can be reduced considerably, thereby enhancing efficiency.

In the second method described above, the mixture ratio of the gas containing a noxious gas to the clean air is determined appropriately by the noxious gas concentration or the quantity of the liquid etc. Generally, when the maximum instantaneous quantity of a supplied gas is 40 liters, clean air is supplied in the range between 80 and 120 liters per minute. These flow rates can be regulated, for example, by the output of the air pump 31, the pore sizes of the pipes 11, 14, and the openings of the valves 21, 22.

In the present invention, it is preferable that both bubbles of a gas containing a noxious gas and bubbles of clean air in the liquid of the buffer means are fine, for example, having a bubble size of 200 $\mu$m or less. Finer bubbles can be produced by using appropriate air diffusing materials or by regulating the flow rate of the gas.

Furthermore, the present invention handles a noxious gas which is mostly corrosive. In particular, ethylene oxide gas has strong oxidizability and permeability, so that constitutive materials like containers and pipes used for the device should have strong resistance against corrosion such as stainless steel.

Next, an example of an actual ethylene oxide treatment using this device will be described.

A device shown in FIG. 1 is connected to an apparatus for sterilizing medical instruments (Product Name: Zemmel 601, Manufacturer: JMC Co., Ltd.). A gas exhausted from the apparatus contained an ethylene oxide gas, which was the subject of treatment. The sterilization apparatus was operated under the following conditions: 55° C. in temperature, 1.0 kg/cm² in processing pressure, 38 liters in processing chamber volume. Furthermore, operations were carried out individually, and aeration was conducted 30 times to purge the ethylene oxide gas remaining in the processing chamber. In this way, this apparatus exhausts a gas containing ethylene oxide intermittently 30 times. The gas exhausted from the sterilization apparatus contained ethylene oxide with the concentration ranging from 180000 to 200000 ppm.

Figure 2:
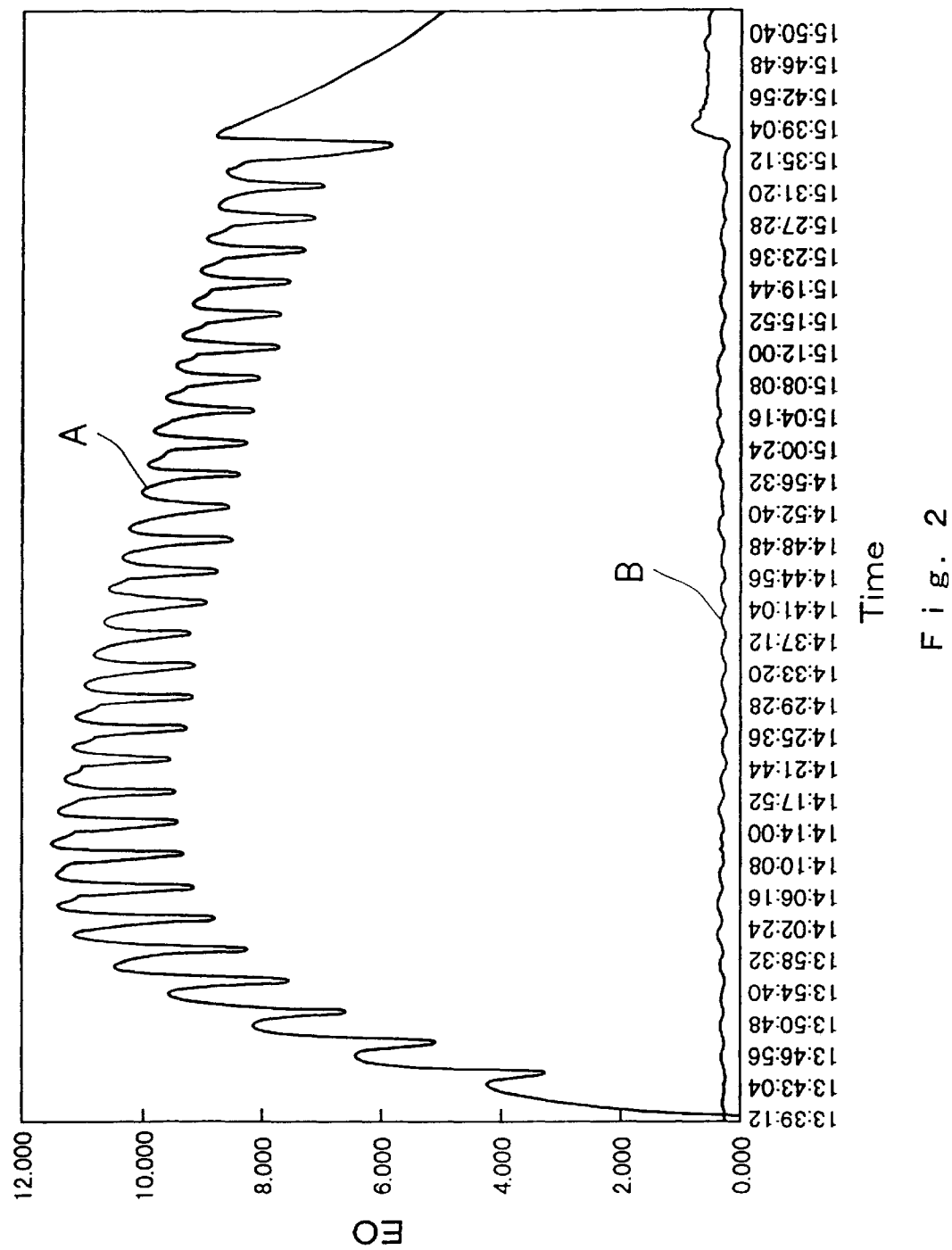
FIG. 2 is a graph showing the results of treating ethylene oxide gas using the first method of the present invention in Embodiment 1.
Figure 3:
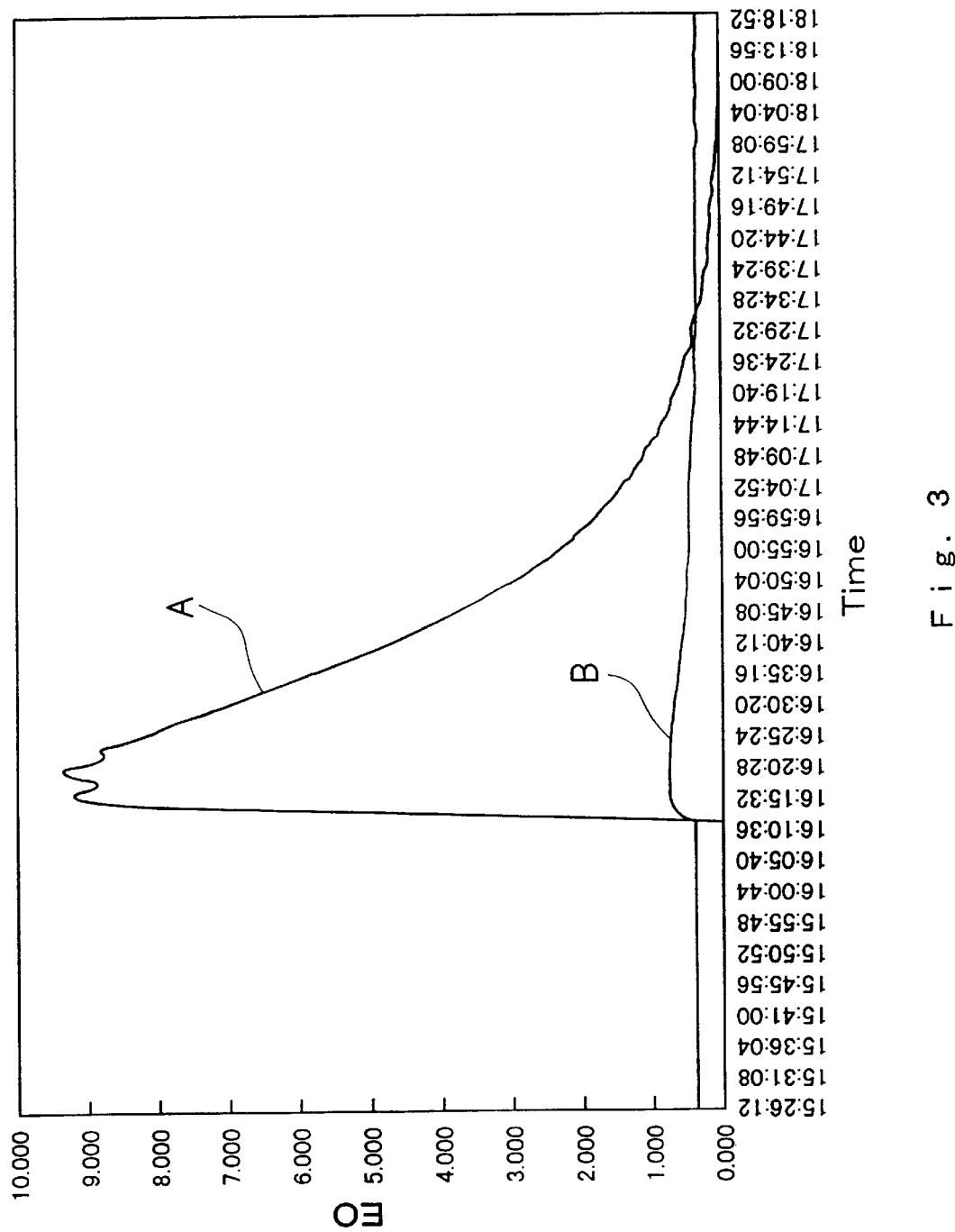
FIG. 3 is a graph showing the results of treating ethylene oxide gas using the second method of the present invention in Embodiment 1.

In the device shown in FIG. 1, the catalytic section 52 used a platinum catalyst which was produced by impregnating platinum into a carrier of calcium aluminates formed in a honeycomb construction. The processing capability of this catalyst is 40000 h$^{-1}$ or less in SV value (space velocity) and 2.0 m/second or less in LV value (linear velocity). The liquid used here was 8 liters of water poured into the container 41 of 12 liters in volume (cylindrical container with 200 mm in inside diameter and 380 mm in height). The temperature of this water was not particularly controlled, so that the temperature of the water ranged within the room temperature (ca. 10 to 20° C.). Then, the ethylene oxide gas was treated under the following conditions by means of the first and the second methods described above. Next, the concentration of ethylene oxide was measured at the pipe 15 (inlet of the purification section 51) and at the pipe 16 (outlet of the purification section 51). The results thereof are shown in the graphs of FIG. 2 and FIG. 3. FIG. 2 is a graph showing the results obtained by the first method described above, and FIG. 3 is a graph showing the results obtained by the second method described above. In both graphs, a curved line A illustrates the concentration measured at the inlet of the purification section 51, and a curved line B illustrates the concentration measured at the outlet of the purification section 51. In both graphs, vertical numbers (unit: ppm) should be multiplied by 1000 for reading the curved line A and multiplied by 10 for reading the curved line B. A horizontal axis indicates processing time (actual time).

Conditions of the First Method

First, exhaust gases released from the sterilization apparatus (air and ethylene oxide gas) were blown into the water 42 of the container 41. At this stage, clean air was not fed therein. The flow rate of the exhaust gas was 80 liters per minute. After aeration had been conducted for 30 times to purge ethylene oxide from the processing chamber of the sterilization apparatus, clean air was blown into the water 42 at a flow rate of 80 liters per minute. Each of the aforementioned aeration was performed at a flow rate of 10 liters per minute.

Conditions of the Second Method

Together with the gases exhausted from the sterilization apparatus (air and ethylene oxide gas), clean air was blown into the water 42 at a flow rate of 80 liters per minute.

As shown by the curved line A in the graph of FIG. 2, when the first method was employed for the treatment, the concentration of ethylene oxide measured at the inlet of the purification section 51 rose rapidly up to almost 12000 ppm and then decreased gradually. The fact that the concentration of ethylene oxide has decreased from the initial value can be understood as the buffer capacity of the water. The curved line A has small peaks which correspond to each aeration of the sterilization apparatus. In other words, the aeration process also has the function of releasing a slight extent of ethylene oxide dissolved in the water. After this aeration was conducted for 30 times, clean air was blown into the water. As a result, ethylene oxide dissolved in the water was released almost to full extent (the utmost right peak of the curved line A), so that the concentration of ethylene oxide has decreased radically thereafter. On the other hand, the curved line B in FIG. 2 shows that the concentration of ethylene oxide at the outlet of the purification section 51 remained constantly at the low level of 10 ppm or less. A total time of 240 minutes was required for the treatment by means of the first method.

As shown by the curved line A in the graph of FIG. 3, when the second method was employed for the treatment, the concentration of ethylene oxide measured at the inlet of the purification section 51 increased abruptly from the moment the exhaustion started (16:10:36) and showed two peaks. However, these two peaks were both values under 10000 ppm. The fact that the concentration of ethylene oxide has decreased from the initial value can be understood as the buffer capacity of the water. Immediately thereafter, the concentration began to decrease and reached almost 0 ppm at 18:04:04. In the case of the second method, clean air was constantly blown into the water, so that small peaks corresponding to each aeration of the sterilization apparatus were hardly observed. On the other hand, the concentration of ethylene oxide measured at the outlet of the purification section 51 showed a slight increase at the exact moment when the concentration at the inlet increased abruptly, but remained constantly at the low level of 5 ppm or less. A total time of 120 minutes was required for the treatment by means of the second method. Accordingly, the processing time was reduced considerably compared with that of the first method described above.

Embodiment 2

Figure 4:
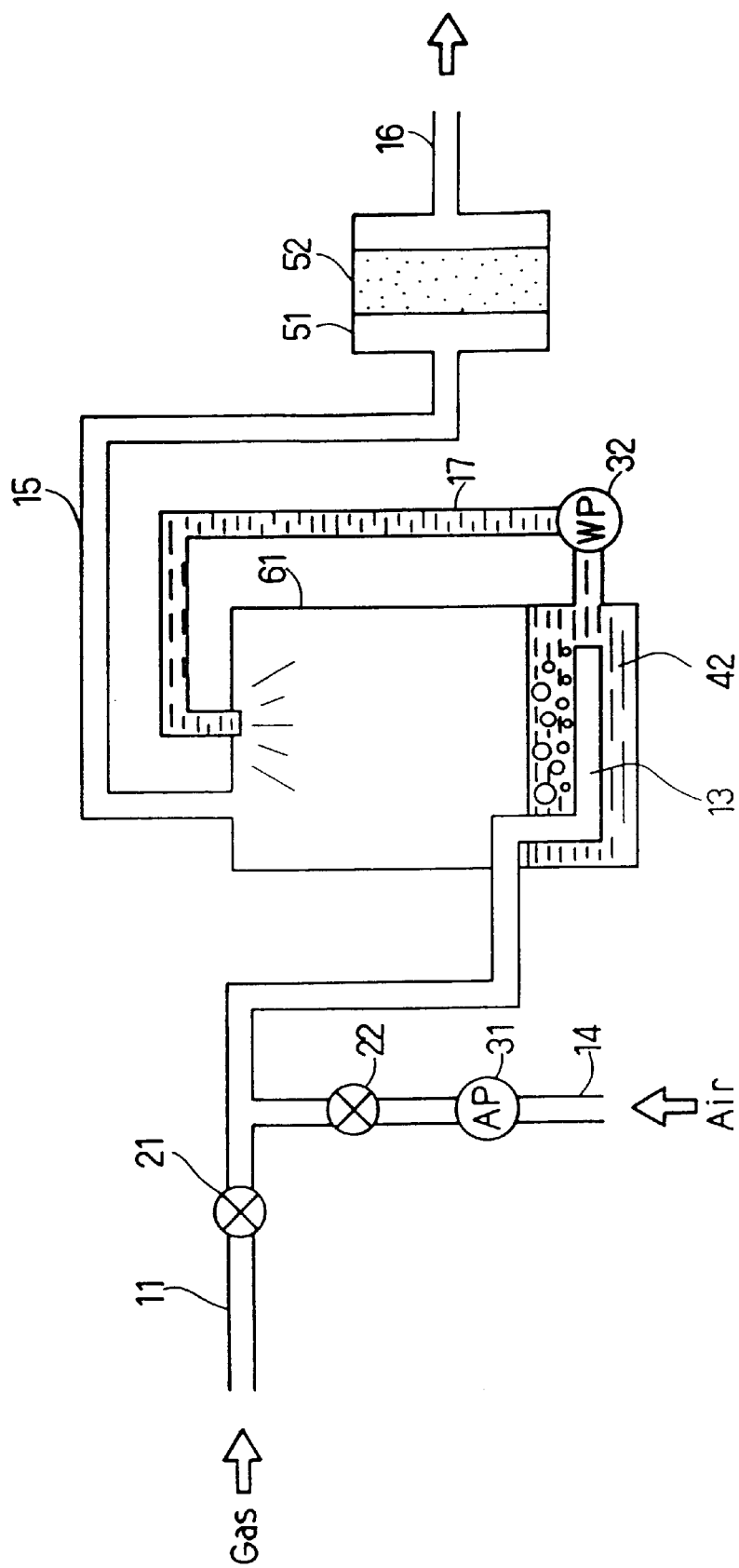
FIG. 4 is a diagram illustrating a schematic configuration of a purifier of Embodiment 2 of the present invention.

A device illustrated schematically in FIG. 4 is provided with means for bringing a gas released from a liquid once again into contact with the liquid. The drawing shows that a container 61 of the device which is to be filled with a liquid 42 used for the buffer means is configured such that one end of a pipe 17 is connected to the bottom of the container 61 on its side face, and the other end of the pipe 17 is connected to the top part of the container 61. This other end portion of the pipe 17 is formed so as to pour the liquid like a shower or to spray the liquid. Furthermore, a water pump 32 is disposed along the pipe 17. The other elements are identical to those of the device shown in FIG. 1 (Embodiment 1) and have been given the same reference numerals. In the following example, a noxious gas will be cleaned by using this purifier.

First, while the switching valve 22 is kept closed (clean air is not supplied in this state), the water pump 32 is operated so that the liquid 42 filled in the container 61 is pumped up through the pipe 17 and poured over from the top part of the container 61 like a shower or sprayed. In this way, the liquid 42 is to circulate between the top and the bottom of the container 61. A flow rate of the liquid in circulation is usually in the range between 30 and 40 liters per minute. The flow rate can be regulated by adjusting an output of the water pump 32 or a pore size of the pipe 17. In this state, the switching valve 21 is opened, and a gas containing a noxious gas is fed through the pipe 11 and blown into the liquid 42 from its end portion 13. Then, the gas turns into bubbles, and while the bubbles go up to the liquid surface, the noxious gas starts to dissolve into the liquid for the first time. Next, the gas released from the liquid 42 is brought once again into contact with the liquid 42 which is poured like a shower or sprayed. During this process, the dissolution of the gas takes place for the second time. The gas with reduced noxious gas concentration is fed through the pipe 15 to the purification section 51, where the gas is cleaned by the catalytic section 52 to be exhausted through the pipe 16 to the outside.

When the concentration of noxious gas dissolved in the liquid 42 rises, or when the gas fed into the buffer section has low noxious gas concentration, the water pump 32 is suspended and the circulation of the liquid 42 is stopped. In this state, the switching valve 22 is opened, and the air pump 31 is operated to blow clean air into the liquid 42. When the concentration of noxious gas dissolved in the liquid 42 rises, the switching valve 21 is closed to stop the supply of the gas containing a noxious gas, but in the case where the gas containing a noxious gas has low noxious gas concentration, this gas may be supplied or stopped. Through the clean air blown into the liquid 42, the dissolved noxious gas is released from the liquid 42. The gas is fed into the purification section 51 in the same manner as described above and then cleaned by the catalytic section 52. The cleaned gas is exhausted through the pipe 16 to the outside. In switching the valve or operating the pump as described above, it is preferable to use a gas concentration sensor or the like for detecting the noxious gas concentration of the liquid 42 and the concentration of noxious gas contained in the gas etc. supplied to the purification section 51 and to control these and other operations automatically based on the detection results.

As described above, the buffer section of this purifier has excellent buffer capacity so that the gas to be fed into the purification section 51 can be regulated to have the noxious gas concentration which is even more uniformed and below a certain value. As a result, the efficiency of purifying the noxious gas has been improved even more. In using this device, the treatment conditions or the device configuration etc. are the same as those applied to the device in Embodiment 1, except that the gas released from the liquid is brought once again into contact with the liquid.

Embodiment 3

Figure 5:
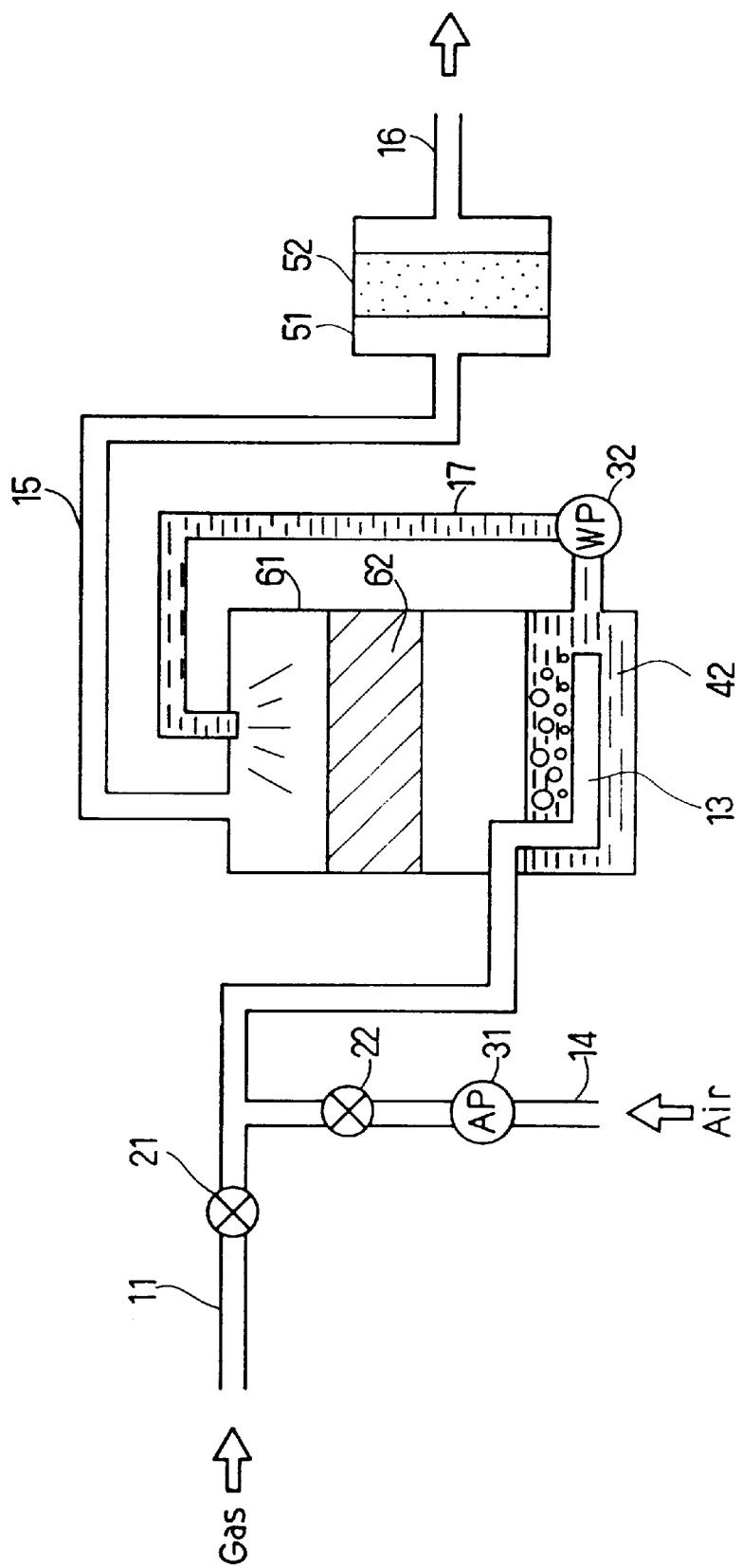
FIG. 5 is a diagram illustrating a schematic configuration of a purifier of Embodiment 3 of the present invention.

A device illustrated schematically in FIG. 5 has the same container 61 as that shown in FIG. 4 (Embodiment 2). In this device, the container 61 is provided with a member 62 for enlarging a surface area on which a gas released from the liquid 42 is brought once again into contact with the liquid 42. In FIG. 5, the same reference numerals are given to the same elements as those shown in FIG. 4. As for this member, members described above can be used.

For example, when a horseshoe-shaped member is used as the member, the member usually has a maximum diameter in the range between 6 and 10 mm. Several pieces of this member are put into a metal basket or the like, and this metal basket is placed inside the container 61 so as to be located between the liquid surface and the shower tap or the spray nozzle. The number of the members is determined appropriately according to the size of the container 61 and so forth. Generally, the number ranges from 5000 to 10000 pieces.

By using this member 62, the liquid poured over from a shower or sprayed over runs along the member's surface, so that the contact area etc. of the liquid with the gas released from the liquid 42 is enlarged. Therefore, the buffer capacity is improved even more. Besides, the process of purifying a noxious gas using this purifier is conducted in the same manner as described in Embodiment 2. The treatment conditions and the device configuration etc. are the same as those applied to the device in Embodiment 2.

Embodiment 4

Figure 6:
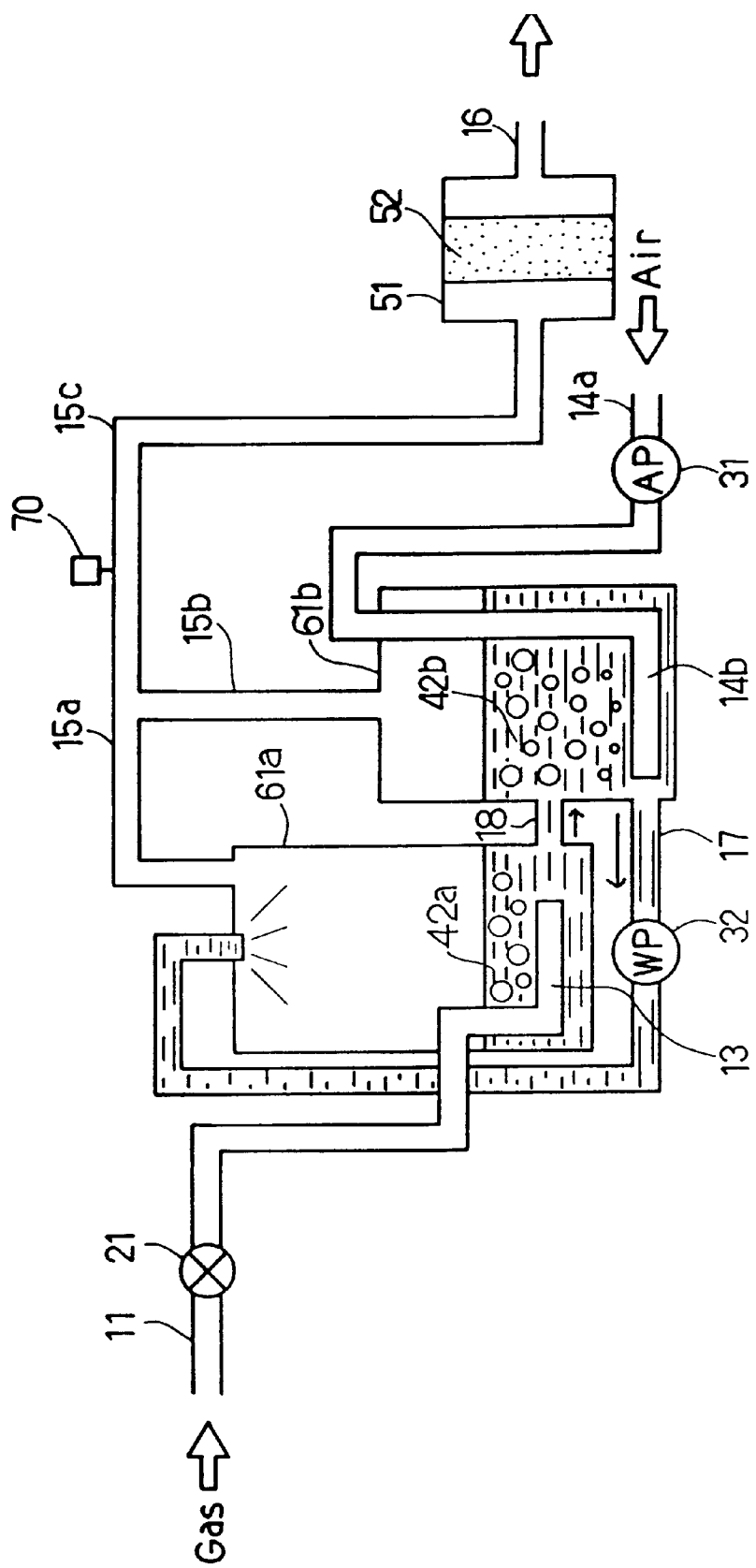
FIG. 6 is a diagram illustrating a schematic configuration of a purifier of Embodiment 4 of the present invention.

A device illustrated schematically in FIG. 6 is provided with a container 61a where a noxious gas is dissolved into a liquid 42a, and a container 61b where a liquid 42b containing the dissolved noxious gas is purified by clean air. An end portion 13 of a pipe 11 is located at the bottom of the container 61a (submerged in the liquid 42a), from which a gas containing a noxious gas is blown in. A switching valve 21 is disposed along the pipe 11. An end portion 14b of a pipe 14a is located at the bottom of the container 61b (submerged in the liquid 42b), and an air pump 31 is disposed along the pipe 14a. Both containers 61a and 61b are connected to each other by a pipe 18. One end of a pipe 17 is connected to the bottom of the container 61b on its side face, and the other end portion of the pipe 17 is connected to the top part of the container 61a. A water pump 32 is disposed along the pipe 17. This other end portion of the pipe 17 is formed so as to pour the liquid like a shower or to spray the liquid. A pipe 15a and a pipe 15b are connected respectively to the top part of the containers 61a and 61b at each one end portion, and the other end portions are connected to one end of a pipe 15c. A gas concentration sensor 70 is provided along the pipe 15c, and the other end of the pipe 15c is connected to a purification section 51. As in Embodiment 1, this purification section 51 has a catalytic section 52 and is connected to one end of an exhaust pipe 16. In the following example, a noxious gas will be purified by using this device.

First, the water pump 32 is operated so that the liquid 42b filled in the container 61b is forwarded to the top part of the container 61a and poured like a shower or sprayed to the bottom part of the container 61a. Furthermore, the liquid 42a filled in the container 61a flows into the container 61b through the pipe 18. As a result, the liquid 42a and the liquid 42b will circulate between the two containers 61a and 61b. The flow rate of the circulating liquid can be determined appropriately by the concentration of noxious gas contained in the gas containing a noxious gas to be supplied. The flow rate can be regulated by adjusting an output of the water pump 32 or a pore size of the pipe 17 etc. Simultaneously with this circulation process, or before or after this circulation process, the air pump 31 is operated. Then, clean air is fed through the pipe 14a and blown into the liquid 42b from the end portion 14b. In this state, the switching valve 21 is opened, and a gas containing a noxious gas is fed through the pipe 11 and blown into the liquid 42a from the end portion 13. Then, the blown gas turns into countless bubbles, and while the bubbles go up to the liquid surface, the noxious gas dissolves into the liquid 42a. The liquid 42a containing the dissolved noxious gas is fed through the pipe 18 into the container 61b where the gas is purified by clean air. The gas released from the liquid 42a in the container 61a is brought once again into contact with the liquid 42b which is forwarded from the container 61b and poured like a shower or sprayed. Since the liquid 42b is purified, the solubility of noxious gas has been improved. The liquid 42b containing the dissolved noxious gas drops to the bottom of the container 61a to become the liquid 42a, which is again forwarded to the container 61b to be purified again. At the same time when the liquid 42b in the container 61b is purified, a gas containing a noxious gas is released from the liquid 42b and fed into the purification section 51 passing through the pipe 15b and the pipe 15c in this order. Furthermore, the gas with reduced noxious gas concentration is fed also from the container 61a into the purification section 51 passing through the pipe 15a and the pipe 15c in this order. Then, the supplied gas is cleaned by the catalytic section 52 to be exhausted through the pipe 16 to the outside. During this purification process in the purification section 51, the concentration sensor attached to the pipe 15c can, based on the concentration of the noxious gas, automatically control the air pump 31, the water pump 32, and the switching valve 21 for regulating the flow rate of the gas to be fed into the purification section 51.

As described above, the buffer section of this device is divided into one section where the noxious gas is dissolved into the liquid and another section where the liquid containing the dissolved noxious gas is purified. Thus, the dissolution process and the purification process described above can be carried out simultaneously. It is therefore no longer necessary to go through two steps of dissolving a noxious gas into a liquid and purifying the liquid as with the devices illustrated in Embodiment 2 and Embodiment 3. As a result, the processing efficiency has been improved significantly. In addition, this device conducts the step of dissolving the noxious gas into the liquid for at least 2 times so that the buffer capacity also has proved to be excellent. Besides, the treatment conditions and the device configuration or the like are the same as those applied to the devices in Embodiment 1 and Embodiment 2.

Embodiment 5

Figure 7:
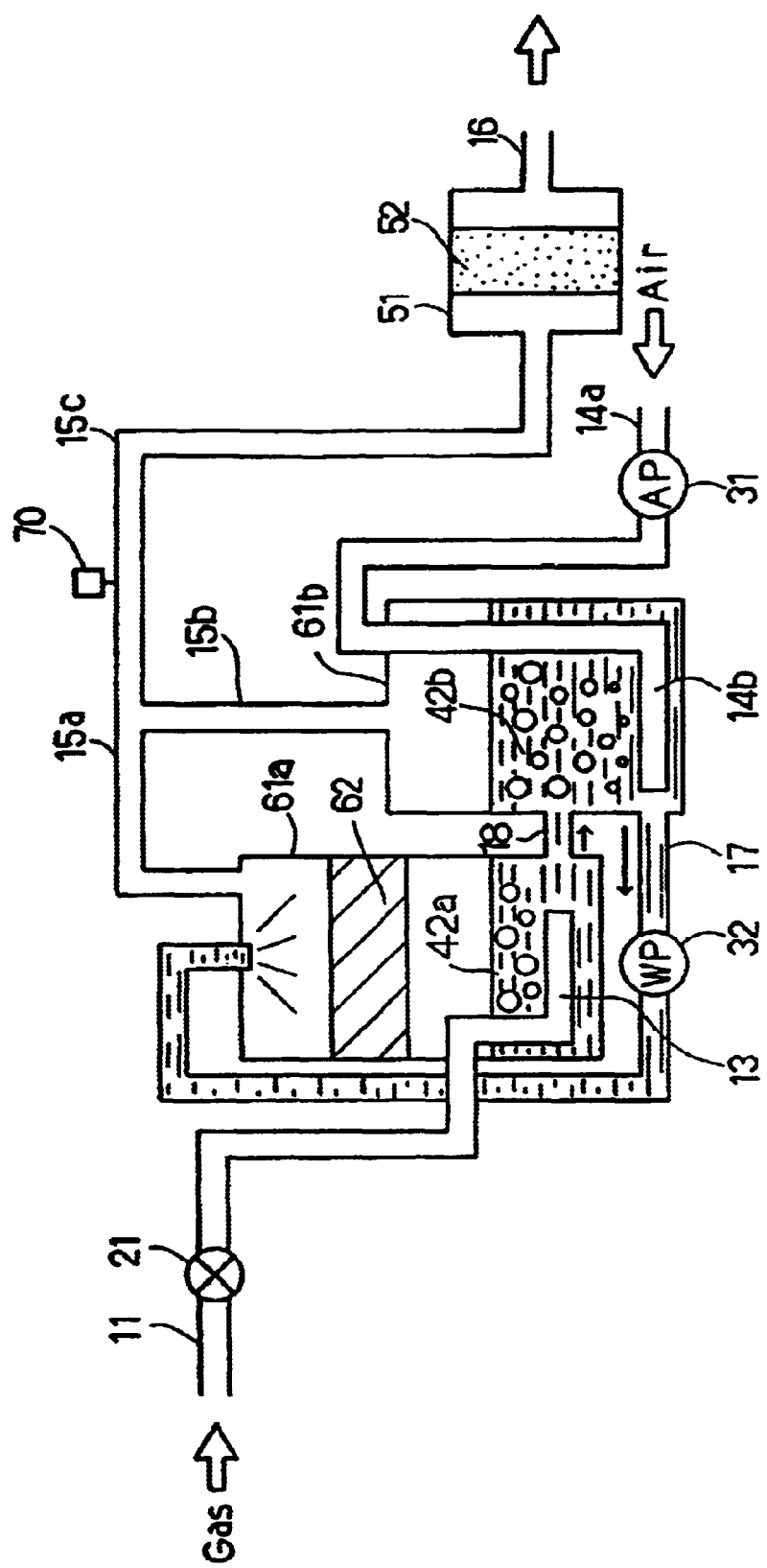
FIG. 7 is a diagram illustrating a schematic configuration of a purifier of Embodiment 5 of the present invention.

A device illustrated schematically in FIG. 7 has the same container 61a as that shown in FIG. 6 (Embodiment 4). In this device, the container 61a is provided with a member 62 for enlarging a surface area etc. on which a gas released from the liquid 42a is brought once again into contact with the liquid 42b by a shower or the like. In FIG. 7, the same reference numerals are given to the same elements as those shown in FIG. 6. As for this member, members described above can be used. For example, in the case where a horseshoe-shaped member is used, the conditions are the same as those shown in Embodiment 3.

By using this member 62, the liquid 42b poured over from a shower or sprayed over runs along the member's surface, so that the contact area etc. of the liquid with the gas released from the liquid 42a is enlarged. Therefore, the buffer capacity is improved even more. Beside, the process of purifying a noxious gas using this device is conducted in the same manner as described in Embodiment 4. The treatment conditions and the device configuration etc. are the same as those applied to the device in Embodiment 4.

Embodiment 6

Figure 8:
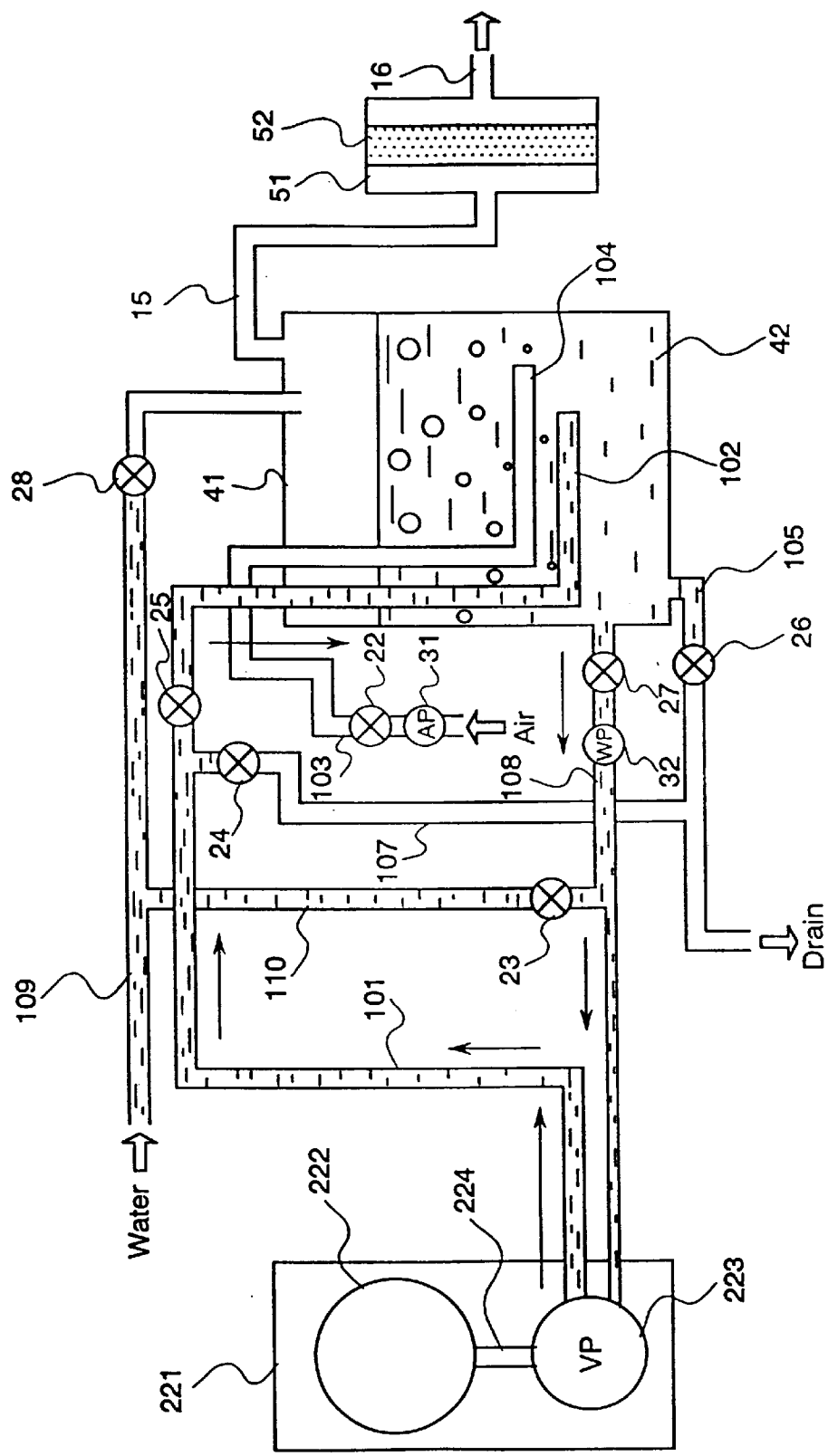
FIG. 8 is a diagram illustrating a schematic configuration of a purifier of Embodiment 6 of the present invention.

A purifier illustrated schematically in FIG. 8 is another example of the present invention, which can be applied to a sterilization apparatus provided with a water-sealed vacuum pump.

As illustrated in FIG. 8, this device is configured such that a water-sealed vacuum pump 223 of a sterilization device 221 is connected to a container 41 with a pipe 101 and a pipe 108. The water-sealed vacuum pump 223 is provided to exhaust a gas containing a noxious gas (sterilizing gas) from a processing chamber 222 through a pipe 224. In the state in which the gas containing a noxious gas is dissolved partly or entirely in water, the gas containing a noxious gas is exhausted from the water-sealed vacuum pump 223. The pipe 101, which is connected to feed the gas containing a noxious gas and water from the water-sealed vacuum pump 223 into the container 41, has a valve disposed along its body. An end portion 102 of the pipe 101 is located at the bottom of the container 41 (submerged in the water or liquid 42). The pipe 108, which is connected to feed the water 42 of the container 41 back to the water-sealed vacuum pump 223, has a valve 27 and a water pump 32 disposed along its body. A drain pipe 105 is led out from the bottom of the container 41 and has a valve 26 disposed along its body. A pipe 107, which is a branch pipe of the pipe 101, is connected to the pipe 15 at a position further than that of the valve 26. The end of the pipe 105 is connected to a storage tank (not shown) located outside the device. The pipe 107 is provided with a valve 24 along its body. Furthermore, this device is equipped with a water supply pipe 109 having a valve 28 disposed along its body, and one end of the pipe 109 is led to the top part of the container 41. Also along the pipe 109, a pipe 110 is connected as a branch pipe with a valve 23 disposed along its body. The end of the pipe 110 is connected to the feed-back pipe 108 described above. A pipe 103 for feeding clean air, which is equipped with an air pump 31 and a valve 22, is placed such that its end portion 104 is inside the container 41 and located at the bottom of the container 41 (submerged in the water 42). One end of a pipe 15 is connected to the top part of the container 41, and the other end of the pipe 15 is connected to a purification section 51. One end of an exhaust pipe 16 for cleaned gas is connected to the purification section 51, and the other end is open to the outside. The purification section 51 has a catalytic section 52.

The way in which the purification of a noxious gas is carried out with this device is the same as in Embodiment 1, except that water circulates between the water-sealed vacuum pump 223 and the container 41. In other words, a gas containing a noxious gas and water are fed from the processing chamber 222 of the sterilization apparatus 221 by means of the water-sealed vacuum pump 223 through the pipe 101 into the water 42 of the container 41. During this process, the gas which was fed in the state of gas dissolves partly or entirely into the water 42, and the gas which was fed in the state of dissolved gas in water remains dissolved in the water 42. In this way, the gas containing a noxious gas can be supplied into the purification section 51 at a constant concentration. The method for purifying the gas may be selected, as in Embodiment 1, from the first method of blowing clean air intermittently according to the noxious gas concentration and the second method of blowing clean air constantly together with the gas containing a noxious gas. From the container 41, the water 42 is partly fed back to the water-sealed pump 223 through the pipe 108 by means of the water pump 32. As illustrated by an arrow in FIG. 8, the water will circulate between the water-sealed vacuum pump 223 and the container 41. In a normal purification operation, water supply is generally stopped, so that the valves 28, 23 as well as the drain valves 24, 26 usually are closed.

This device is equipped with a safety system. If an abnormal state occurs, the water-sealed vacuum pump 223 stops supplying the gas containing a noxious gas and the water into the container 41.

Figure 9:
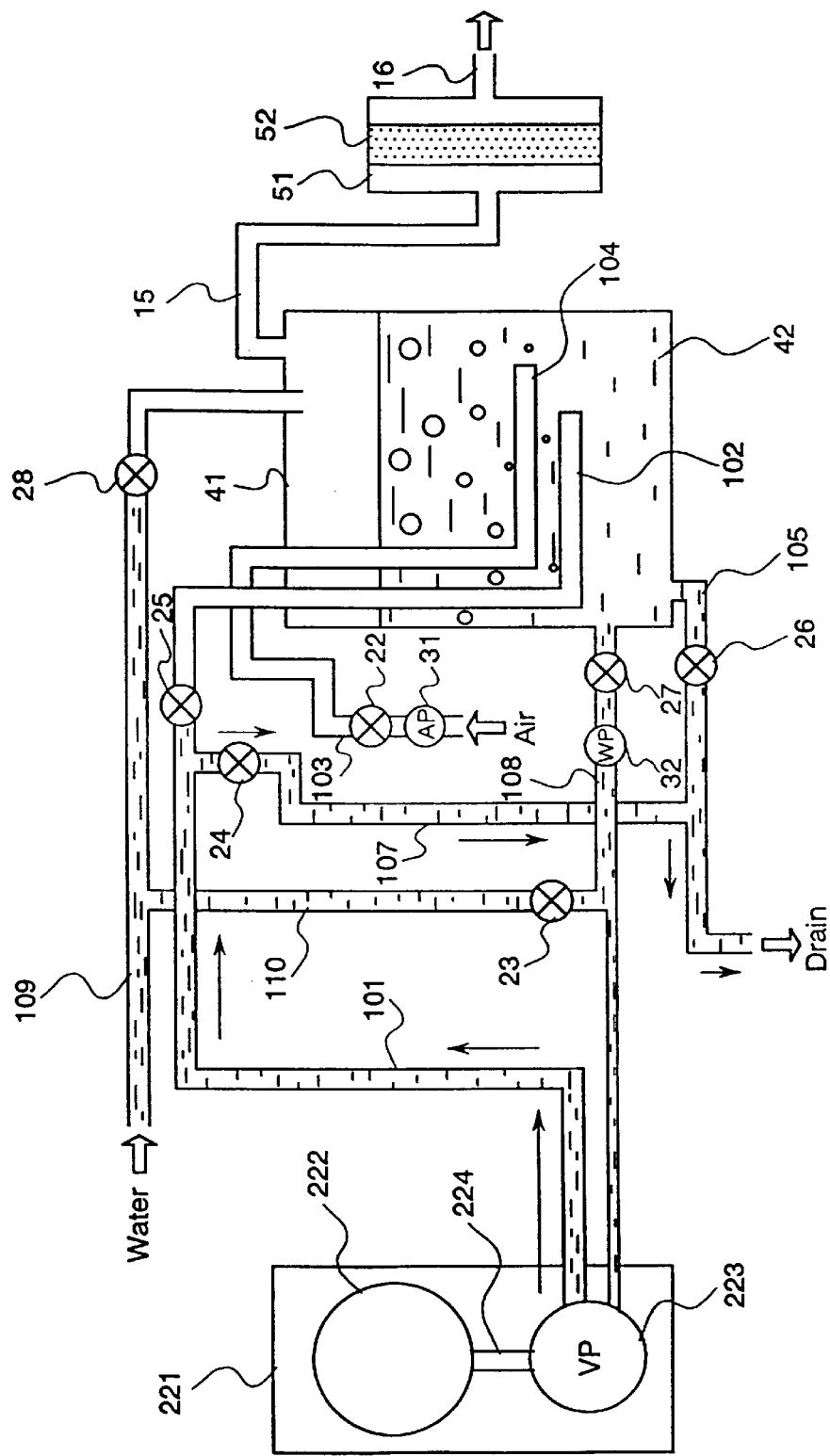
FIG. 9 is a diagram illustrating a state in which a safety system is operated in Embodiment 6.

In the abnormal state, as illustrated schematically in FIG. 9, the valve 25 will be closed so as to stop the supply of the gas containing a noxious gas and the water into the container 41. At the same time, the valve 24 will be opened to exhaust the gas and the water through the pipes 107 into a reserve tank (not shown) located outside the device. For preventing the water 42 from being fed back to the water-sealed vacuum pump 223, the valve 27 will be closed and the water pump 32 will be stopped. Simultaneously with this operation, or before or after this operation, the valve 23 will be opened so that water is supplied through the pipes 110 and 108 to the water-sealed vacuum pump 223. In the abnormal state, the gas containing a noxious gas and the water will flow as indicated by an arrow in FIG. 9.

When the device returns to a normal operation, the water and the gas containing a noxious gas which were stored in the reserve tank are fed into the container 41. Then, the noxious gas is cleaned by the purification section 51 and then exhausted as a clean gas to the outside of the device.

Examples of such an abnormal state are: suspension of the device itself, suspension of a fan (not shown) of the purification section 52, suspension of the air pump 31 and other elements; abnormal burning temperature in the catalytic section 52; and abnormal decrease or increase in the quantity of the water 42 in the container 41.

In operating this device, a microcomputer or the like preferably is installed to control the switching between a normal operation and an emergency operation automatically. For example, an abnormal condition can be detected by a liquid level sensor installed inside the container 41 or by a temperature sensor of the catalytic section 52 or by a detection sensor of noxious gas concentration attached to the pipes 15, 16. Based on the abnormal condition detected by these sensors, the operation can be switched automatically to an emergency operation. If these sensors etc. detect that the device has returned to a normal state, the device preferably is switched to a normal operation.

The purifier of the present invention was explained above by referring to six representative examples. However, the present invention is not limited to these examples. The present invention also may be carried out by combining a part of each embodiment or by combining all the embodiments described above. Furthermore, other changes may be added to the above embodiments for carrying out operations.

INDUSTRIAL APPLICABILITY

As described above, the purifier of the present invention is equipped with buffer means using a liquid which dissolves a noxious gas component temporarily and later releases the dissolved noxious gas. With the use of this means, in the case where the quantity or the concentration of the produced noxious gas fluctuates, the noxious gas can be purified economically and safely.

What is claimed is:

1. A purifier of a noxious gas comprising means for supplying a gas containing a noxious gas component, buffer means using a liquid that dissolves the noxious gas component in the supplied gas temporarily and later releases the dissolved noxious gas component, and means for purifying the noxious gas component in the gas supplied from the buffer means,
   wherein the liquid in the buffer means dissolves the noxious gas component when a concentration of the noxious gas component in the supplied gas is high and releases the noxious gas component previously dissolved when the concentration is low.

2. The purifier according to claim 1, further comprising means for supplying a clean gas, wherein the clean gas is supplied into the liquid in the buffer means.

3. The purifier according to claim 2, wherein the gas containing the noxious gas component and the clean gas are supplied simultaneously into the liquid in the buffer means.

4. The purifier according to claim 1, wherein the buffer means comprises means for bringing the gas released from the liquid once again into contact with the liquid.

5. The purifier according to claim 4, wherein a clean gas is not supplied into the liquid when the gas released from the liquid is brought once again into contact with the liquid, and a clean gas is supplied into the liquid when the gas released from the liquid is not brought once again into contact with the liquid.

6. The purifier according to claim 1, wherein the buffer means comprises a dissolution section for dissolving the noxious gas into the liquid, a purification section for cleaning the liquid containing the dissolved noxious gas with a clean gas, and means for bringing the gas released from the liquid in the dissolution section into contact with the liquid cleaned in the purification section.

7. The purifier according to claim 6, wherein the liquid circulates between the dissolution section and the purification section, and the gas containing the noxious gas is fed into the purification means from the purification section or from the dissolution section and the purification section.

8. The purifier according to claim 4, further comprising means for increasing at least either a contact area or a contact time when the gas released from the liquid and the liquid are brought into contact once again.

9. The purifier according to claim 8, wherein the means for increasing at least either a contact area or a contact time is means to shoot the liquid in the form of spray or shower.

10. The purifier according to claim 8, wherein the means for increasing at least either a contact area or a contact time is means to let the liquid run along a surface of a member.

11. The purifier according to claim 1, wherein the purification means comprises means for purifying the noxious gas component using a catalyst.

12. The purifier according to claim 11, wherein the purification means comprises means for detecting a catalytic temperature and means for controlling a quantity of the gas containing the noxious gas to be supplied into the purification means based on the temperature detected by the detection means of catalytic temperature.

13. The purifier according to claim 1, wherein the liquid is at least one selected from the group consisting of water, sodium hydroxide aqueous solution, alcohols, and polyalcohol derivatives.

14. The purifier according to claim 1, wherein the liquid is water in the case where the noxious gas to be purified is ethylene oxide.

15. The purifier according to claim 14, wherein a concentration of ethylene oxide contained in the gas supplied from the buffer means to the purification means is controlled to be 20000 ppm or less in the case where the noxious gas to be purified is ethylene oxide.

16. The purifier according to claim 2, wherein the clean gas is a clean air.

17. The purifier according to claim 1, wherein the means for supplying the gas into the liquid is means for producing a large quantity of bubbles by blowing the gas into the liquid.

18. The purifier according to claim 1, wherein the gas containing the noxious gas is supplied together with water by a water-sealed vacuum pump, the water circulating between the water-sealed vacuum pump and the buffer means.

19. The purifier according to claim 18, wherein in an abnormal state the water and the gas containing the noxious gas supplied from the water-sealed vacuum pump are not supplied into the buffer means but instead released to the outside of the purifier.

20. The purifier according to claim 19, wherein the water and the gas containing the noxious gas released to the outside of the purifier are stored temporarily in a storage tank, the water and the gas containing the noxious gas stored inside the storage tank being supplied to the buffer means after the purifier returned to a normal state.

* * * * *